United States Patent
Lee et al.

(10) Patent No.: US 8,830,955 B2
(45) Date of Patent: Sep. 9, 2014

(54) MULTICAST SYSTEM USING CLIENT FORWARDING

(75) Inventors: Michael Lee, Cupertino, CA (US); Matt Regan, Glen Waverley (AU); Geoff M. Smith, Palo Alto, CA (US)

(73) Assignee: Interval Licensing LLC, Seattle, WA (US)

( * ) Notice: Subject to any disclaimer, the term of this patent is extended or adjusted under 35 U.S.C. 154(b) by 167 days.

(21) Appl. No.: 12/727,451

(22) Filed: Mar. 19, 2010

(65) Prior Publication Data

US 2010/0172354 A1     Jul. 8, 2010

Related U.S. Application Data

(62) Division of application No. 11/683,025, filed on Mar. 7, 2007, now Pat. No. 7,719,985, which is a division of application No. 09/656,538, filed on Sep. 6, 2000, now Pat. No. 7,194,549.

(51) Int. Cl.
*H04W 4/00* (2009.01)
*H04L 12/18* (2006.01)

(52) U.S. Cl.
CPC .......... *H04L 12/185* (2013.01); *H04L 12/1854* (2013.01)
USPC ........... 370/331; 709/224; 709/226; 709/229; 709/239

(58) Field of Classification Search
USPC ......... 370/254, 331, 338, 349, 351, 394, 389, 370/408, 411, 466, 401; 709/203, 224, 229, 709/226, 238, 239
See application file for complete search history.

(56) References Cited

U.S. PATENT DOCUMENTS

| | | | |
|---|---|---|---|
| 5,331,637 A | | 7/1994 | Francis et al. |
| 5,355,371 A | | 10/1994 | Auerbach et al. |
| 5,673,252 A | | 9/1997 | Johnson et al. |
| 5,831,975 A | | 11/1998 | Chen et al. |
| 5,887,252 A | * | 3/1999 | Noneman ............... 455/463 |
| 5,905,871 A | | 5/1999 | Buskens et al. |
| 5,910,179 A | | 6/1999 | Mohseni |
| 5,914,798 A | | 6/1999 | Liu |
| 5,926,501 A | * | 7/1999 | Souissi et al. ........... 375/131 |
| 5,938,732 A | * | 8/1999 | Lim et al. ................ 709/229 |
| 5,940,391 A | * | 8/1999 | Malkin et al. ........... 370/390 |
| 6,108,779 A | | 8/2000 | Dean et al. |
| 6,131,123 A | | 10/2000 | Hurst et al. |
| 6,138,144 A | | 10/2000 | DeSimone et al. |
| 6,147,967 A | * | 11/2000 | Ying et al. .............. 370/222 |
| 6,167,025 A | * | 12/2000 | Hsing et al. ............ 370/216 |
| 6,216,167 B1 | | 4/2001 | Momirov |
| 6,226,684 B1 | * | 5/2001 | Sung et al. .............. 709/238 |
| 6,247,050 B1 | * | 6/2001 | Tso et al. ................. 709/224 |
| 6,247,059 B1 | | 6/2001 | Johnson et al. |

(Continued)

OTHER PUBLICATIONS

Core Selection Method for Multicast Routing Kenneth L Calvert Ellen W. Zegura Michael J. Donahoo.*

(Continued)

*Primary Examiner* — Hassan Phillips
*Assistant Examiner* — Ajay Cattungal
(74) *Attorney, Agent, or Firm* — Perkins Coie LLP

(57) ABSTRACT

A system and method are disclosed for multicasting information to a set of clients that includes transmitting the information to a primary client from a server and instructing the primary client to forward the information to a secondary client.

13 Claims, 10 Drawing Sheets

(56) References Cited

U.S. PATENT DOCUMENTS

| | | |
|---|---|---|
| 6,269,080 B1 | 7/2001 | Kumar |
| 6,269,404 B1 | 7/2001 | Hart et al. |
| 6,336,119 B1 | 1/2002 | Banavar et al. |
| 6,523,069 B1 * | 2/2003 | Luczycki et al. ............. 709/249 |
| 6,535,498 B1 * | 3/2003 | Larsson et al. ................ 370/338 |
| 6,721,907 B2 * | 4/2004 | Earl ................................ 714/57 |
| 6,760,340 B1 * | 7/2004 | Banavar et al. ............... 370/408 |
| 6,795,399 B1 | 9/2004 | Benmohamed et al. |
| 6,862,263 B1 * | 3/2005 | Simmons ...................... 370/217 |
| 6,889,254 B1 * | 5/2005 | Chandra et al. ............... 709/224 |
| 6,982,960 B2 * | 1/2006 | Lee et al. ...................... 370/254 |
| 7,013,389 B1 | 3/2006 | Srivastava et al. |
| 7,016,334 B2 * | 3/2006 | Cohen et al. .................. 370/338 |
| 7,194,549 B1 | 3/2007 | Lee et al. |
| 7,324,972 B1 * | 1/2008 | Oliver et al. .................... 705/40 |
| 7,719,985 B2 | 5/2010 | Lee et al. |
| 2001/0040895 A1 * | 11/2001 | Templin ........................ 370/466 |
| 2002/0001310 A1 * | 1/2002 | Mai et al. ...................... 370/390 |
| 2002/0150094 A1 * | 10/2002 | Cheng et al. .................. 370/389 |
| 2002/0165977 A1 | 11/2002 | Novaes |
| 2003/0095504 A1 * | 5/2003 | Ogier ............................ 370/235 |
| 2004/0240578 A1 * | 12/2004 | Thesling ........................ 375/285 |
| 2008/0205394 A1 * | 8/2008 | Deshpande et al. ........... 370/390 |

OTHER PUBLICATIONS

Calvert et al., "Core Selection Methods for Multicast Routing," College of Computing, Georgia Institute of Technology, Atlanta, Georgia, 1995, 22 pages. cited by other.

Calvert et al., "Core Selection Methods for Multicast Routing," Proceedings of the 4th International Conference on Computer Communications and Networks, Sep. 1995, pp. 638-642, IEEE Computer Society. cited by other.

Core Selection Methods for Multicast Routing Calvert, K.L. Zegura, E.W. Donahoo, M.J. This paper appears in: Computer Communications and Networks, 1995. Proceedings., Fourth International Conference on Publication Date: Sep. 20-23, 1995. cited by examiner.

* cited by examiner

| Primary Clients | |
|---|---|
| PC 1 | ~ 610 |
| PC 2 | ~ 612 |
| PC 3 | ~ 614 |
| PC 4 | ~ 616 |

Figure 6A

| Client Record | |
|---|---|
| Client ID | ~ 620 |
| Performance to server | ~ 622 |
| TX performance | ~ 624 |
| RX performance | ~ 626 |
| Router 1 | ~ 628 |
| Router 2 | ~ 630 |
| Router 3 | ~ 632 |
| Router 4 | ~ 634 |
| Router 5 | ~ 636 |
| RX client 1 | ~ 638 |
| RX client 2 | ~ 640 |

Figure 6B

MULTICAST SYSTEM USING CLIENT FORWARDING

CROSS-REFERENCE TO RELATED APPLICATION(S)

This application is a divisional of U.S. patent application Ser. No. 11/683,025, filed Mar. 7, 2007, entitled "MULTICAST SYSTEM USING CLIENT FORWARDING," which is a divisional of U.S. patent application Ser. No. 09/656,538, filed Sep. 6, 2000, entitled "MULTICAST SYSTEM USING CLIENT FORWARDING," now U.S. Pat. No. 7,194,549, which applications are incorporated herein by reference in their entireties.

TECHNICAL FIELD

The present invention relates generally to transmitting information over a network. More specifically, a multicast system that uses clients to forward packets is disclosed.

BACKGROUND

For some time now, network architects have been designing multicast (also referred to as point to multipoint or one to many) systems for delivering information from a source to a subset of the users on a network. Multicast systems have not generally enjoyed the same widespread adoption as unicast (one to one) and broadcast (one to all) systems.

Various factors have made adoption of multicast systems difficult over large diverse networks. The problem of managing subscribing and unsubscribing users to multicast groups has proven difficult. Furthermore, in most multicast schemes, it is necessary that each router in the network be multicast enabled so that it can manage the distribution of packets to the correct nodes. Although later versions of the IP protocol have included multicast, legacy routers may not support multicast and there has been some difficulty settling on a widely adopted multicast standard. The issue of security is also a problem. Preventing unauthorized users from accessing packets sent from routers to multicast group members is difficult.

Some "multicast" solutions implemented today over a diverse network are actually just large scale implementations of multiple unicast systems.

FIG. 1 is a diagram illustrating a prior art multicast scheme implemented using a set of servers that unicast packets to clients in the "multicast" group. A set of servers 102 sends packets 110 through a heterogeneous network 104. Heterogeneous network 104 includes a number of routers 106, some of which are not shown. Routers 106 may include legacy routers that do not support multicasting. As a result, servers 102 must implement multicasting by actually unicasting packets to a set of clients 108. This is illustrated by the letter identifying each of the clients on the packets 110 sent from the servers. Obviously, this arrangement taxes the processing resources of the servers as each new client requires a new set of packets to be sent from one of the servers.

It would be useful if a multicast system could be designed that would work with legacy routers that are not multicast enabled in a heterogeneous network, yet would not require the servers to send packets to each of the multicast clients.

SUMMARY

A multicast system that uses clients to forward packets to other clients is described. A multicast server handles signing up primary clients and directing transmitting packets to the primary clients. In addition, the multicast server directs the primary clients to forward information packets to the next level of receiving clients. The receiving clients may in turn transmit packets to another level of receiving clients. By cascading clients in this manner, information may be disseminated among a large group of clients very quickly. The server may decide which clients belong in which level of the forwarding tree of clients by determining the client location and/or the client performance in either receiving or transmitting data.

As new clients sign up, existing clients are evaluated as candidates to transmit to the new client based on their network location, performance, or both. A new client may also be selected as a primary client, receiving information directly from the server. The failure of a client to transmit information is detected by the server and the clients receiving information from that client are redirected to a new source. The source may either be another client, the server itself, or a dedicated server used to transmit information to clients that have been clients of a failed source.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a method of multicasting information to a set of clients includes transmitting the information to a primary client from a server and instructing the primary client to forward the information to a secondary client.

In one embodiment, a method of multicasting information to a set of clients includes determining a performance parameter for each of the clients and selecting a subset of the clients to be primary clients based on the performance parameter. The information is transmitted to the primary clients for retransmission to other clients in the set of clients.

In one embodiment, a method of multicasting information to a set of clients includes determining a network location for each of the clients and selecting a subset of the clients to be primary clients based on the network location. The information is transmitted to the primary clients for retransmission to other clients in the set of clients.

In one embodiment, a method of multicasting information to a set of clients includes determining a network location for each of the clients and determining a performance parameter for each of the clients. A subset of the clients is selected to be primary clients based on the performance parameter and the determined network location. The information is transmitted to the primary clients for retransmission other clients in the set of clients.

In one embodiment, a method of adding a new client to a multicast group includes receiving a request from the new client to subscribe to the multicast group and selecting an existing client to transmit information to the new client based on the network locations of the new client and the existing client, and a comparison of a performance parameter of the existing client with performance parameters of other existing clients.

In one embodiment, a method of subscribing to a multicast group includes sending a request to a server from a subscribing client to subscribe to the multicast group and receiving from the server an identifier of a transmitting client that will send data to the subscribing client. Data is received from the transmitting client.

In one embodiment, a method of forwarding information from a transmitting client to a receiving client in a multicast group includes receiving an instruction from a multicast server to forward information to the receiving client and receiving the information. The information is forwarded to the receiving client.

In one embodiment, a method of redirecting a receiving multicast client from a failed transmitting client includes receiving a message from the receiving client that information is not being received and sending a message to the receiving client indicating a new source of the information. A message is sent to the new source directing the new source to send the information to the receiving client.

In one embodiment, a method of redirecting a receiving multicast client from an under performing transmitting client includes receiving a message from the receiving client indicating the rate that information is being received and determining that the information rate falls below a performance standard. A message is sent to the receiving client indicating a new source of the information and a message is sent to the new source directing the new source to send the information to the receiving client.

In one embodiment, a server is configured to multicast information to a set of clients. The server includes a client interface configured to transmit the information to a primary client from the server and to instruct the primary client to forward the information to a secondary client.

In one embodiment, a first client is configured to forward multicast information to another client. The first client includes a server interface configured to receive the information from the server and a client interface configured to forward the information to the other client.

In one embodiment, a system for multicasting information to a set of clients includes a server configured to transmit the information and a primary client configured to receive the transmitted information and to forward the information to a secondary client.

In one embodiment, a computer program product for multicasting information is embodied in a computer readable medium and includes instructions for transmitting the information to a primary client from a server and instructing the primary client to forward the information to a secondary client.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6A is a diagram illustrating a primary client data structure used in the server to store a list of primary clients.

FIG. 6B is a diagram illustrating a client record that may be kept by the server for each of the clients.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
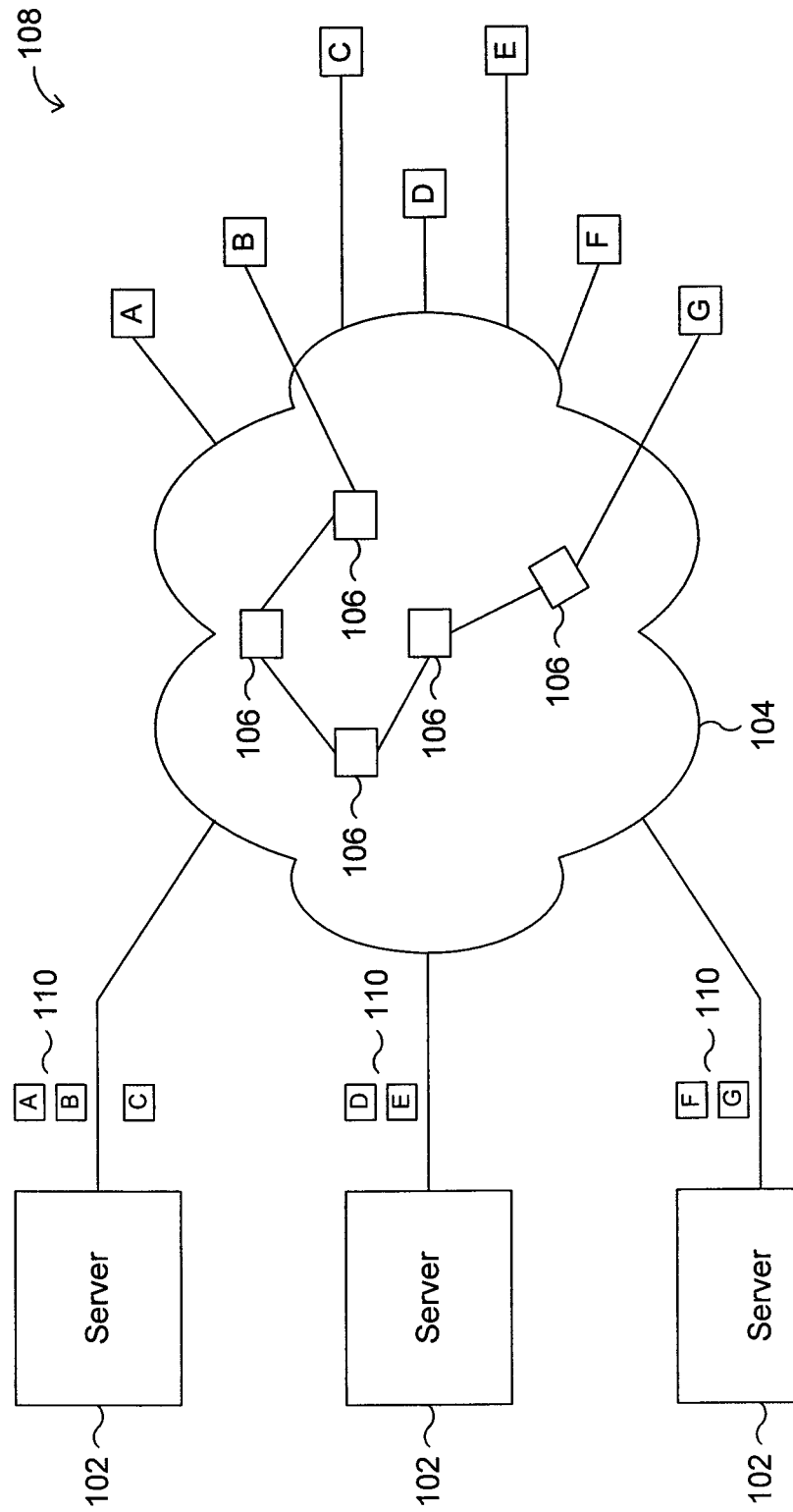
FIG. 1 is a diagram illustrating a prior art multicast scheme implemented using a set of servers that unicast packets to clients in the "multicast" group.
Figure 2A:
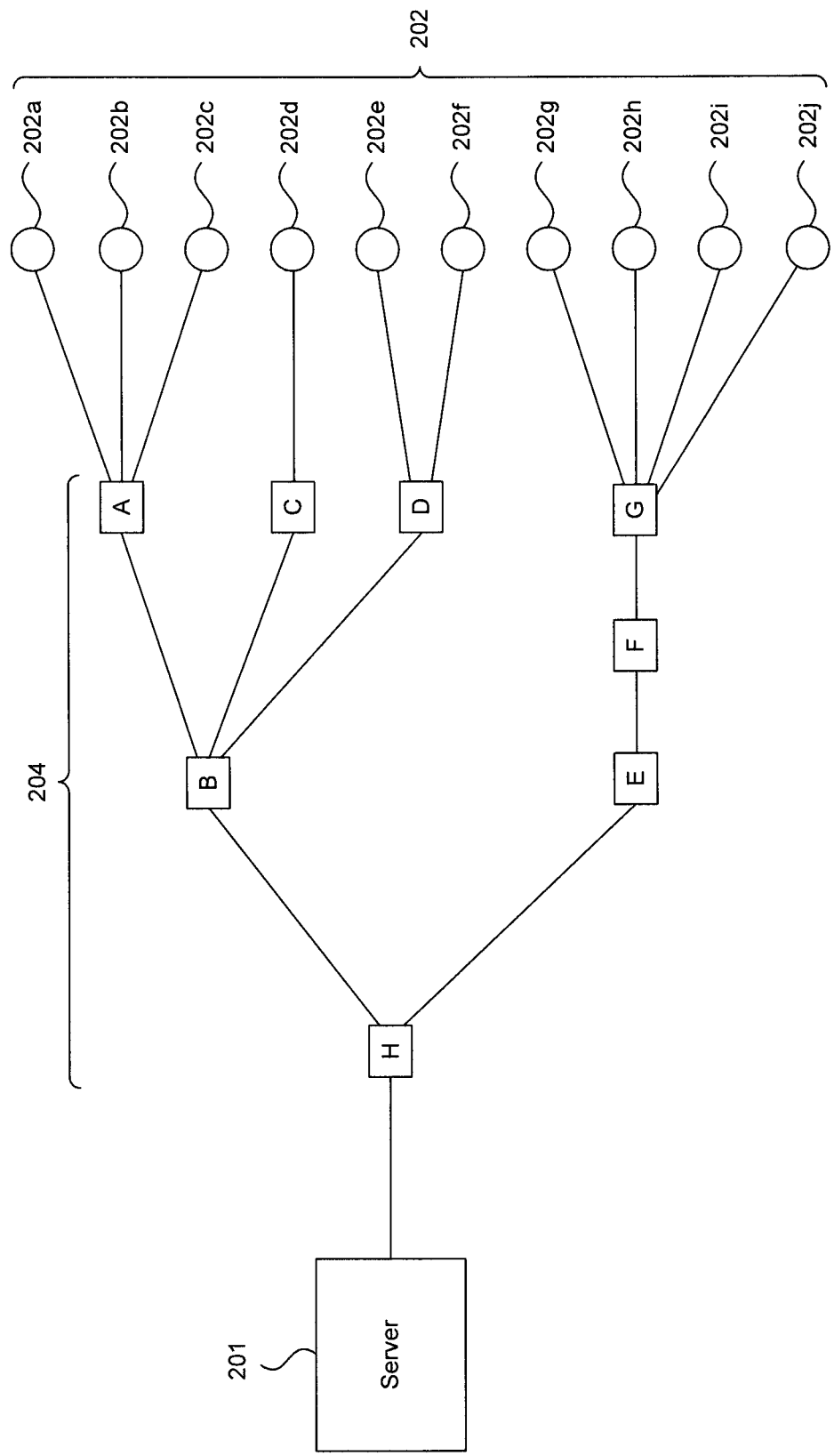
FIG. 2A is a block diagram illustrating a network where a server 201 manages a multicast to a set of clients 202 through a network of routers 204 that are not necessarily multicast enabled.

FIG. 2A is a block diagram illustrating a network where a server 201 manages a multicast to a set of clients 202 through a network of routers 204 that are not necessarily multicast enabled. Server 201 receives requests from the group of clients or otherwise determines that clients should be added to a multicast list. Server 201 then establishes connections with some or all of the clients for the purpose of determining a subset of clients that are able to receive information from the server and process it quickly. The clients that are determined to have good performance are designated as primary clients.

In one embodiment, the server establishes a connection with all of the clients and sends a small amount of test data to the client along with an instruction to send a reply back to the server. The length of time required to reply is used as a performance parameter that is compared with the performance parameter of other clients to help determine the group of primary clients. The primary clients are then sent the multicast information directly from the server and the primary clients are each responsible to forward the multicast information to one or more other clients.

In addition to considering the performance of the clients, the multicast server may also take into consideration the network location of various candidate primary clients for the purpose of insuring that different areas of the network are populated by a suitable number of primary clients. The term, "network location" is used to refer to the relative position of the clients in the network considering the various connection to routers and other clients. Network location may or may not be related to physical location. A client could theoretically be physically located next to another client but connected to a completely different system of routers. In such a case, the clients would have the same physical location, but would be far apart with respect to their network location. This ensures that packets are not unnecessarily forwarded a great distance in the network from the primary client to a secondary client that receives multicast data from the primary client.

For example, referring back to the network shown in FIG. 2A, clients 202a, 202b, and 202c are all connected to the same router A. Router A is sometimes referred to as a leaf router because it is the last router in a chain of routers that is connected to a set of clients. Because clients 202a, 202b and 202c are all connected to the same router, it would be advantageous if one of those clients were designated as a primary client and if that primary client forwarded packets to the other two clients.

Thus, in one embodiment, the server pings the clients and traces the route that packets travel from the clients to the server. In this manner, if the server recognizes router A as the last router between the server and several clients, it can conclude that those clients have a similar network location and the server may insure that at least one of those clients is selected as a primary client even if one of those clients is not one of the best performing clients over all.

Clients may be grouped together by network location, not only by leaf router, but also by a router that is further removed. For example, clients 202a through 202f are all connected through different leaf routers to Router B. The server may consider this larger grouping in determining the set of primary clients.

A number of schemes are used in different embodiments to determine primary clients and assign clients to other clients. As noted above, in one embodiment, both network location and client performance are considered. Also, performance may be evaluated for all of the clients or for only enough clients until a suitable number of primary clients are designated. In an embodiment where all the clients are evaluated, the clients are first grouped by network location. The number of groups may be required to be less than the number of primary clients that can be served by the server. Clients within groups are compared for performance and a set of primary clients is selected. If the number of groups is less than the total number of primary clients, then the server may select additional primary clients based on performance.

Preference may be given to clients in groups that have a large number of clients. In one embodiment, this is implemented by setting different performance thresholds for clients in different groups to become primary clients. For example, the first client in the group may have to exceed a relatively low performance threshold to become a primary client but the second best client in that group may have to exceed a higher threshold. As can be appreciated, different schemes are preferred under different conditions. In some embodiments, network location may not be considered exclusively or not at all.

It should also be noted that the clients may sign onto the multicast not all at once but one at a time. In such a case, each client may be evaluated as it signs up to determine whether it should be a primary client. In other embodiments, a client may become a primary client only after it has successfully received the multicast for a certain period of time. During the multicast, clients may be designated or undesignated as primary clients based on periodic monitoring of their performance. Once the client is forwarding packets to another client, its performance in forwarding packets may be evaluated by determining the performance of the clients that are receiving the forwarded packets.

It should also be noted that, so far, only primary clients and clients that receive packets from primary clients have been described in detail. In addition, clients that receive packets from primary clients may also be instructed to forward packets to other clients. Thus, primary clients forward packets secondary clients. Secondary clients forward packets to tertiary clients, and so on. By cascading clients in this manner, the number of clients in the multicast group that are served can increase very rapidly with little additional demand on the server's processing resources.

The server functions to monitor the location and performance of all of the clients in the multicast group. The server directs certain clients to forward packets to other clients. The server need only directly send packets to the primary clients. Thus, for the purpose of control, the server is connected to all of the clients. This control connection includes a relatively light amount of data traffic. For the purpose of sending significant amounts of data, the server is only connected to the primary clients.

Figure 2B:
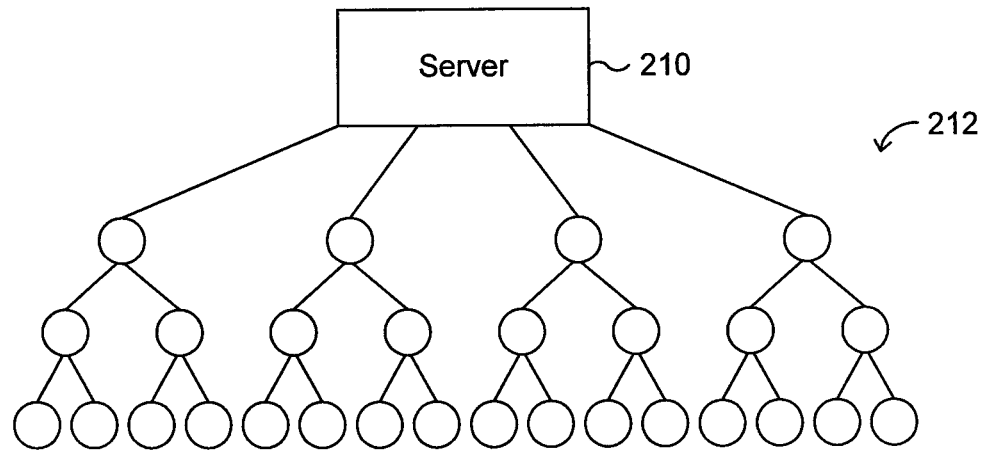
FIG. 2B is a block diagram illustrating the topology of the data network. A server 210 provides multicast data to a web of clients 212.

FIG. 2B is a block diagram illustrating the topology of the data network. A server 210 provides multicast data to a web of clients 212. Server 210 only sends data directly to the first set of four primary clients. The data is forwarded from the primary clients to the next level of secondary clients. Data may be forwarded to multiple cascaded levels of clients. In one embodiment, data is forwarded through up to ten levels of clients. In some embodiments, it is advantageous to set a limit to the number of forwarding stages to limit latency to the last clients in the forwarding tree.

Figure 2C:
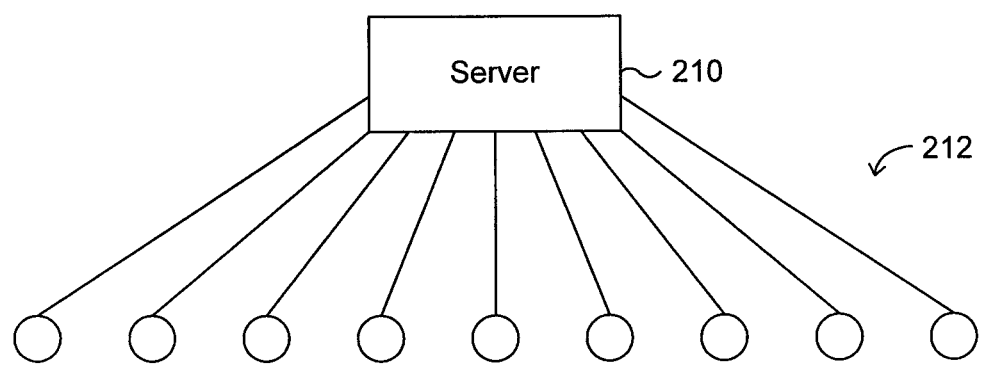
FIG. 2C is a block diagram illustrating the network topology for control information.

FIG. 2C is a block diagram illustrating the network topology for control information. For the purpose of control information (i.e. receiving performance data, and directing clients to forward and receive clients from other clients) the server is connected to each of the clients. Server 210 establishes contact with each of the clients 212 to give instructions to the clients and to measure performance. Thus, the server is able via the control topology illustrated in FIG. 2C to virtually construct the data topology illustrated in FIG. 2B. The data topology is continually changing as the server may instruct clients to forward packets to new clients that sign up or may change assigned clients based on measures of performance for the purpose of optimizing the network.

It should be noted, that although one server is shown in the preceding diagrams for the purpose of illustration, the function of the server may be shared among a group of servers. Also, in the embodiments shown, the primary clients that receive direct connections are actual clients, that is, they receive information from the server primarily for the purpose of receiving the multicast and presenting the information to a user. In some embodiments, a primary client that is not really a client but actually a server may be planted in the network at a strategic location where it can serve a large number of clients. As is described below, a server may be used as a backup for primary clients so that when a primary client fails, that server may immediately and reliably take over the task of forwarding packets to the secondary clients connected to the primary client. In this manner, a high degree of reliability may be obtained even though diverse client platforms are used to forward packets.

Figure 3A:
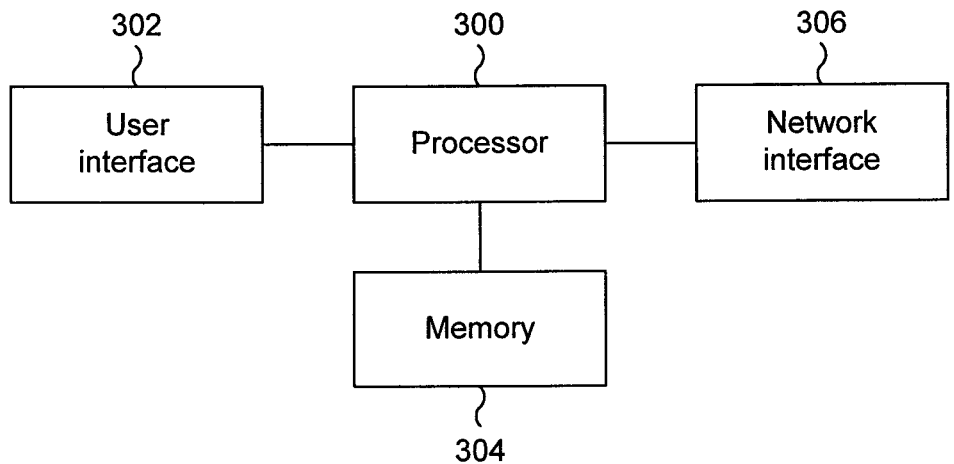
FIG. 3A is a block diagram illustrating the structure of a server used in one embodiment.

FIG. 3A is a block diagram illustrating the structure of a server used in one embodiment. A processor 300 is connected to a user interface 302 that is used to program and configure the server. Processor 300 is also connected to a memory 304 that may include both volatile and non volatile memory elements as well as disc or tape drives. The memory is used by the processor to store the network configuration and also to temporarily store packets that are being forwarded to the various primary clients connected to the server. A network interface 306 is connected to processor 300. Network interface 306 handles both the control connections to all of the clients as well as the data connections to the set of primary clients. In addition, network interface 306 may send applets to the clients that enable clients to forward packets to other clients and to receive instructions from the server.

Figure 3B:
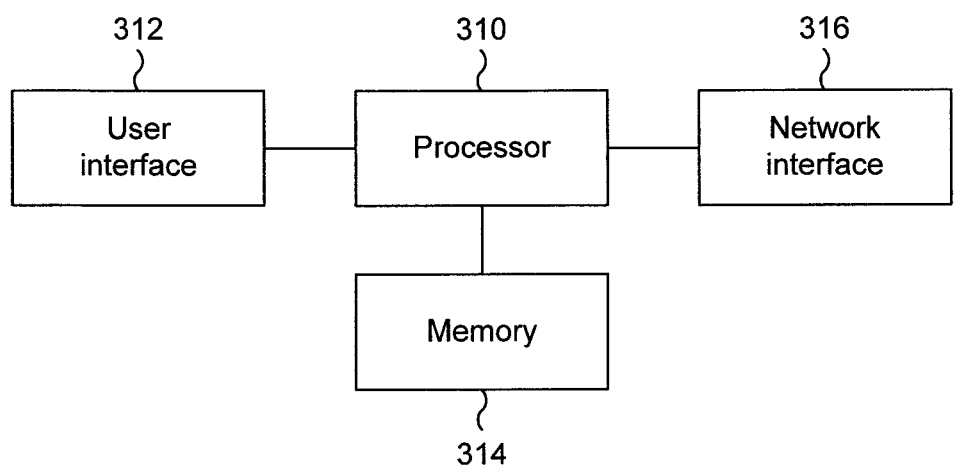
FIG. 3B is a block diagram illustrating the structure of a client. A processor 310 is connected to a user interface 312.

FIG. 3B is a block diagram illustrating the structure of a client. A processor 310 is connected to a user interface 312. User interface 312 is generally used to display the multicast data to the user of the client. In addition, processor 310 implements a program that enables the client upon receiving instructions from the server to forward packets corresponding to the multicast being displayed to the user to another client. Memory 314 is used to store the program and packet information for the purpose of forwarding packets in response to instructions received from the server. Network interface 316 is used to receive packets from the server or another client and to forward the packets to other clients as required. In one embodiment, the server is a Unix server. The client is implemented on a web browser and the program for forwarding to other clients is delivered to the client using a Java applet.

Figure 4:
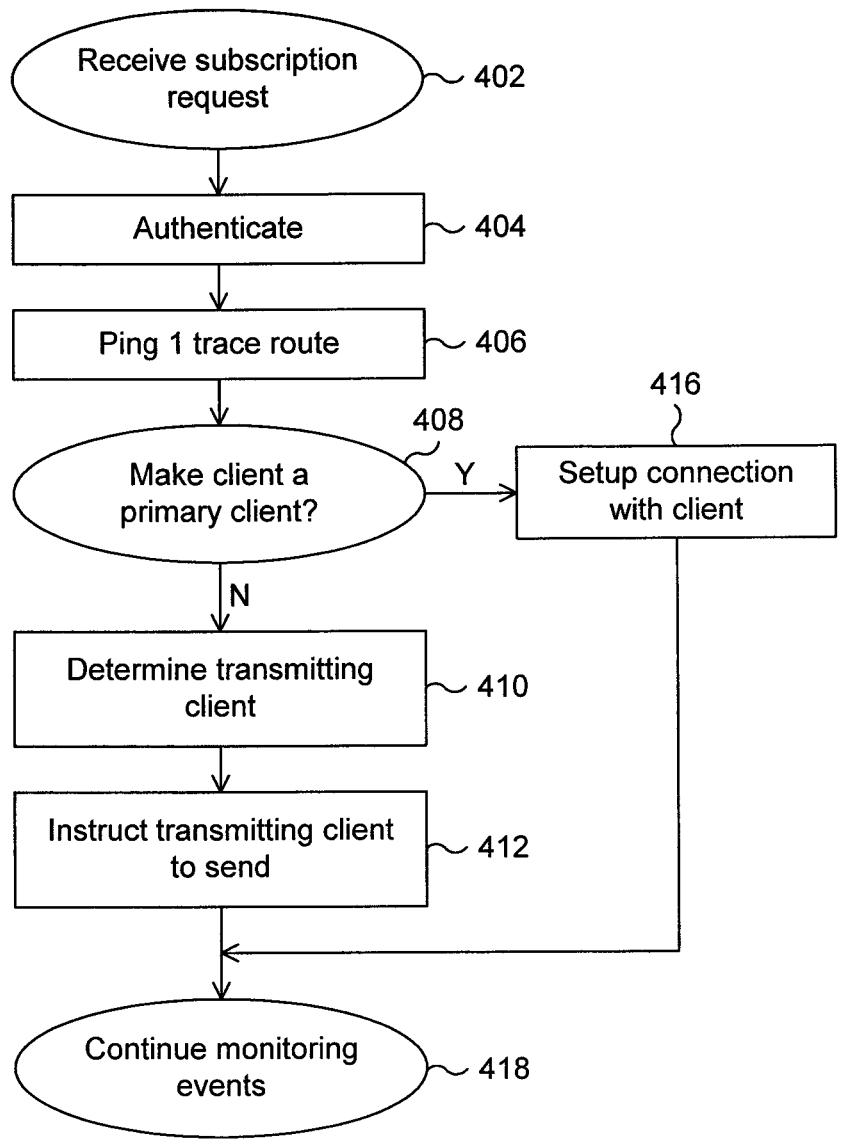
FIG. 4 is a flowchart illustrating a process implemented on the server for signing up a new client.

FIG. 4 is a flowchart illustrating a process implemented on the server for signing up a new client. A subscription request is received at 402. The request is authenticated in a step 404. In general, the server must insure that the client signing up for the multicast is an authorized client. Next in a step 406, the server pings the client for the purpose of determining a trace route from the client to the server. The server may also send some data to the client and request that the data be forwarded back to the server for the purpose of determining the performance of the client.

Next, in a step 408, the server determines whether to make the client a primary client. If the client is not to be a primary client, then control is transferred to a step 410 and the server determines a client that will be the transmitting client for the new client. As described above, the determination of whether the client will be a primary client may be made by taking into consideration both the network location of the client and the performance of the client. Likewise, the determination of a transmitting client may be made by considering network location, performance, or some combination of the two.

Next, in a step 412, the server sends a message to the transmitting client instructing the transmitting client to begin sending multicast data to the new client. In addition, the server may instruct the new client to forward packets to another client Control is then transferred to a step 418 and the server continues to monitor client events. In one embodiment, each client installs an application that enables it to receive server instructions and to forward packets to other clients when so instructed. In other embodiments, an applet may be sent to a client that enables the client to forward packets while packets are being received.

If, in step 408, it is determined that the client is to be a primary client, then, in step 416 the server sets up a direct connection with the client and begins to forward multicast data to the client. As noted above, the server may actually instruct another server to send data directly to the primary client in an implementation where multiple servers are used.

Figure 5:
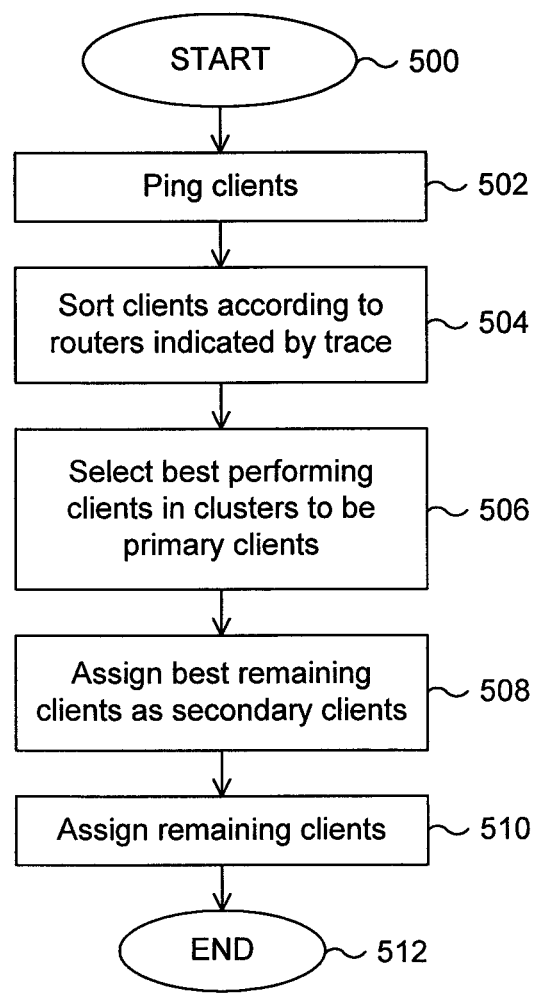
FIG. 5 is a flowchart illustrating a process implemented on the server for beginning a multicast with a multiple number of clients.

FIG. 5 is a flowchart illustrating a process implemented on the server for beginning a multicast with a multiple number of clients. The process starts at 500. In a step 502 the server pings the clients for the purpose of obtaining trace routes and determining the performance of the clients. Next, in a step 504, the clients are sorted according to the routers indicated by the trace. In one embodiment, the clients are clustered using a heuristic algorithm that organizes the clients into suitably sized groups. Next, in a step 506, the best performing clients in each cluster are designated to be primary clients. Next, in a step 508, the best remaining clients are selected as secondary clients. In different embodiments, the process may continue to assign further levels of clients based on their performance and location. In step 510, the remaining clients are assigned to other clients and the process ends at 512.

Thus, the server initiates the multicast by obtaining information about the network location and performance of each of the clients and selecting various levels of clients to forward to other clients. A direct connection is established with the primary clients and instructions are sent to clients to set up client-client forwarding relationships.

FIG. 6A is a diagram illustrating a primary client data structure used in the server to store a list of primary clients. The data structure simply includes a list of suitable client identifiers such as an IP address for each of the primary clients. In the example shown, primary clients 610, 612, 614 and 616 are included in the list.

FIG. 6B is a diagram illustrating a client record that may be kept by the server for each of the clients. The client record includes a client ID 620. A performance parameter 622 that represents the performance of the client measured when the server pings a client is also included. In addition, a transmit performance parameter 624 may be stored that represents the reported performance of the transmitting client from a receiving client that is receiving a transmission from the transmitting client. Also, a receive performance parameter 626 may be included that represents a report from the client indicating the rate at which data is successfully being received from the server or from whatever client is transmitting to the client.

A list of routers 628, 630, 632, 634, and 636 is also included that represent the routers determined by a trace route that are approximate to the client in the network. In different embodiments, the number of routers listed may vary. The router list is used to define the client's network location. A receive client field 638 and a receive client field 640 are also included. Those fields are used to store the identity of clients to which the client is transmitting. In different embodiments, different numbers of fields of receive clients may be included.

Figure 7:
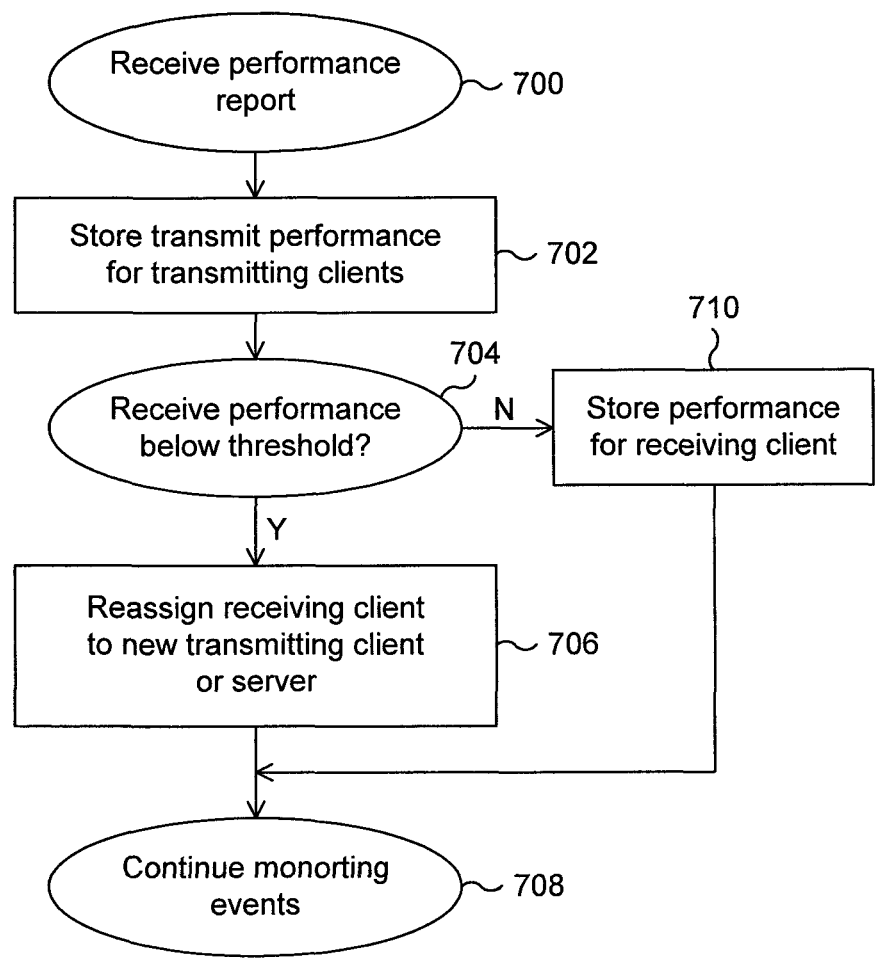
FIG. 7 is a flowchart illustrating a process implemented on the server for monitoring clients.

FIG. 7 is a flowchart illustrating a process implemented on the server for monitoring clients. The server sends a request to the client that periodically causes the client to send a performance report to the server. Such a performance report is received in a step 700. Next, in a step 702, the transmit performance is stored for the transmitting client that is sending information to a client that sent the performance report. The same performance may be stored as the receive performance of the reporting client. It should also be noted that the client may be a primary client in which case the client receives information directly from the server so that there is no transmitting client.

In a step 704, it is determined whether a receiving client performance is below a threshold. If the received performance is below the threshold, then control is transferred to a step 706 and the receiving client is reassigned to a new transmitting client or to a server. As noted above, a special server may be designated for the purpose of transferring clients that are not receiving good performance for the multicast. The receiving client is reassigned by simply sending a message to the new client or server to begin transmitting information to the client. In addition, a message may be sent to the receiving client indicating that multicast information will now be received from a new source. Once this is done, control is transferred to step 708 and the server continues monitoring events. In one embodiment, performance is determined by the streaming data rate. In other embodiments, other measures of performance are used, such as the latency from the server.

If, in step 704, it is determined that the received performance is above the acceptable threshold, then the performance is stored for the receiving client in step 710 and control is transferred to step 708.

Thus, the server continually receives reports from clients and evaluates the performance enjoyed by those clients. In this manner, the server can insure a high level of performance for each of the clients even though the server does not directly handle forwarding information packets to the clients. Instead, the server monitors performance and assures that clients that are not receiving good performance are directed to a new transmitting client or server. In addition, the performance reports are stored so that new clients may be assigned to transmitting clients that are performing well.

Figure 8:
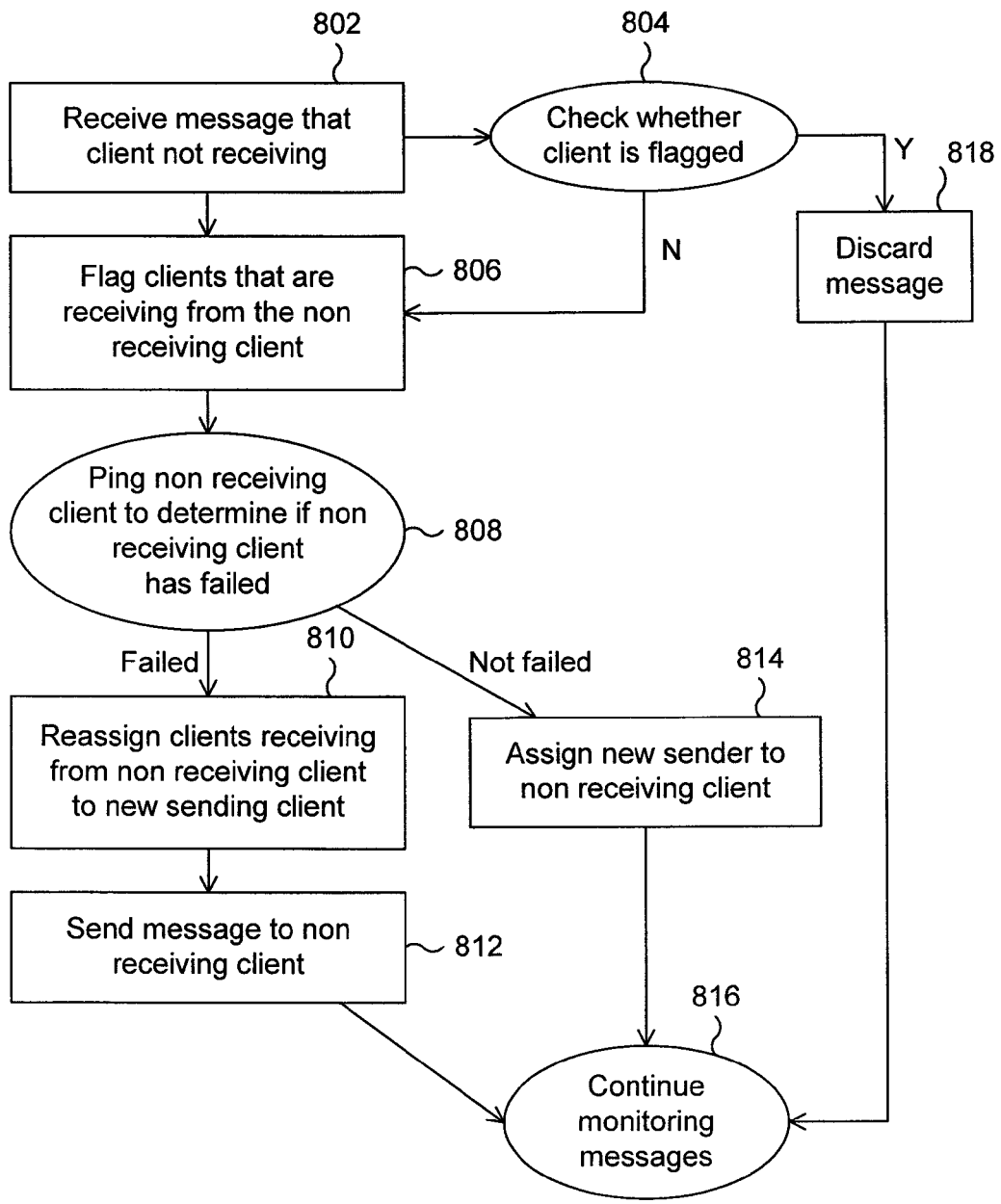
FIG. 8 is a flowchart illustrating a process implemented on the server for reassigning clients of a failed transmitting client to a new transmitting client.

FIG. 8 is a flowchart illustrating a process implemented on the server for reassigning clients of a failed transmitting client to a new transmitting client. Preferably, the reassignment is accomplished without disturbing the tree of clients below the failed transmitting client. In addition to periodically sending a performance report to the server, the clients may also detect that no data is being received from their transmitting client or that the rate of data being received has dropped below an acceptable threshold. In such a case the client will send an error message to the server indicating that the transmitting client has failed. The client may also autonomously seek an alternative source from a pre-defined list. Such a message is received in step 802 by the server that a client is not receiving data. Control is then transferred to a step 804 and it is checked whether the client is flagged as belonging to a tree of clients below a non-performing server.

As described above, the clients may be cascaded through multiple levels. When the client at the top of a large branch of clients stops receiving data from its transmitting client, that client will eventually run out of data to transmit to the clients branching from it. However, if the client at the top of the branch has not failed, there is no reason to reconstruct the branch. The branch may simply be attached to a different transmitting client at the top. Fortunately, the first client in the branch to determine that multicast data is not being received should be the top client in the branch. There will be some delay before that client runs out of data to send to the clients below it. Thus, when the top client indicates the data is not being received, all the clients in its branch below it may be temporarily flagged so that those clients will not be reassigned when they report that they are not receiving data unless, in fact, the top client in the branch has failed.

If, in step 804, it is determined that the client is not flagged, then, in step 806, the clients in the branch below the client that sent the message that are directly or indirectly receiving data from the non receiving client are flagged so that four error messages will temporarily be ignored by the server. In one embodiment, clients that are not receiving data are configured to repeatedly send error messages so that ignoring initial error messages is not a problem. Another error message will be sent. In other embodiments, the flag may cause the error message to be temporarily buffered and reconsidered later by the server. After clients in the branch of the non receiving client are flagged in step 806, control is transferred to a step 808 and the non receiving client is pinged to determine if the non receiving client has failed. This is necessary because it may be that the transmitting client is transmitting, but the non receiving client sending an error message may have a problem with its network interface that is preventing it from receiving the transmission.

If the non receiving client has failed, then control is transferred to a step 810 and the clients in the branch that received from the non receiving client are assigned to a new sending client. As noted above, the new sending client may actually be a special server designated for the purpose of taking care of clients that have had a problem. Next, in a step 812 the message is sent to the non receiving client so that the non receiving client can reconfigure and hopefully begin successfully receiving the multicast. Control is then transferred to step 816 and the server continues to monitor messages from clients.

If, in step 804, it is determined that the client is flagged, then control is transferred to a step 818 and the message from the client is discarded. As described above, such a message would be sent by a client in a branch where the client at the top of its branch stopped receiving data from its transmitting client as a result of failure of that transmitting client. After step 818, control is transferred to step 816. If, in step 808, it is determined that the non receiving client has not failed, then control is transferred to step 814 and a new sender is assigned to the non receiving client. Control is then transferred to step 816.

Thus, clients report problems with receiving multicast information. The server determines whether the source of the problem is the client itself or the client that is transmitting to the reporting client. Meanwhile, the branch below the non receiving client is kept intact so that it may be regrafted as a whole to a new transmitting client if necessary. In this manner, the amount of reconfiguration required when a failure occurs within the network is minimized.

Figure 9A:
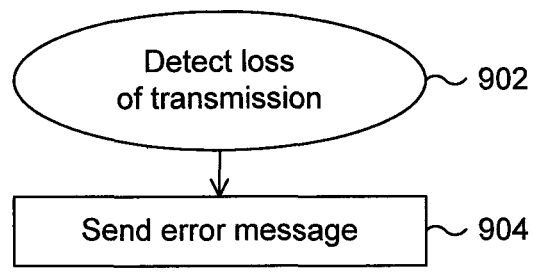
FIG. 9A is a flowchart illustrating a process for sending an error message.

The server request instructs a client to execute a set of relatively simple procedures for the client to report back to the server data that enables the server to manage the flexible network topology. FIG. 9A is a flowchart illustrating a process for sending an error message. In a step 902, the client detects that it is no longer receiving data from its sending client. An error message is sent in a step 904. As described above, the error message may be repeatedly sent if the loss of transmission is continued to be detected.

Figure 9B:
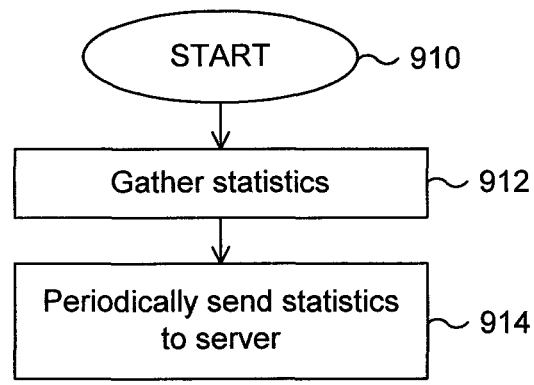
FIG. 9B is a flowchart illustrating a process for sending statistics to the server. The process starts at 910.

FIG. 9B is a flowchart illustrating a process for sending statistics to the server. The process starts at 910. In a step 912, statistics are gathered by the receiving client. In a step 914, statistics are periodically sent to the server.

Figure 9C:
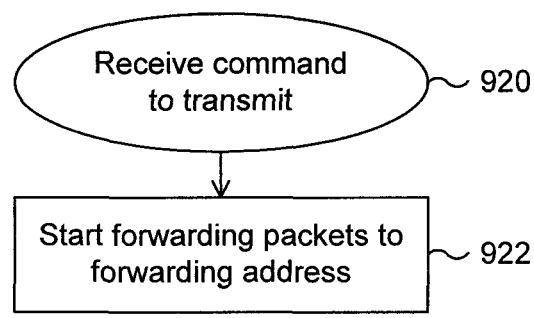
FIG. 9C is a flowchart illustrating a process implemented on a client to forward packets to another client.
Figure 7:
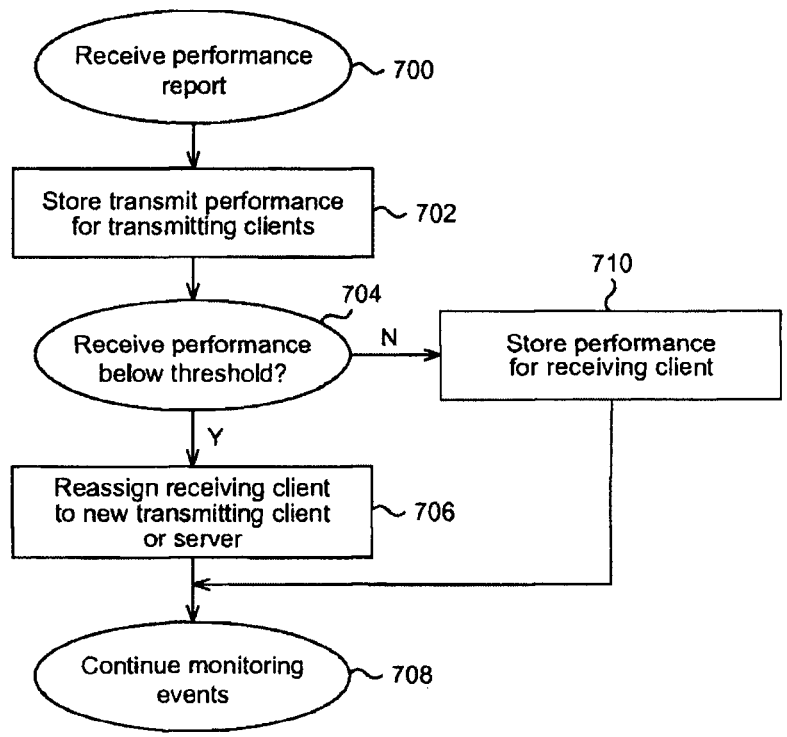

FIG. 9C is a flowchart illustrating a process implemented on a client to forward packets to another client. In a step 920 a command is received from the server to transmit to the new client. Next, in a step 922, the client starts forwarding packets to the forwarding address of the new client specified by the server.

Thus, the server is able to construct a forwarding network topology where clients are designated to receive packets from the server or another client and forward those packets to other clients. A number of cascading levels of clients may be implemented. In this manner, information is spread to a large number of clients very quickly. The server is able to adjust the topology of the forwarding tree of clients based on periodic performance reports from the clients as well as error messages indicating that part of the tree has failed. When a client fails, the branch of clients receiving data from that client are transferred to another transmitting client with a minimum of reconfiguration required. Because both location and performance are used by the server to determine the topology of the client forwarding tree, network resources can be utilized efficiently and a multicast system can be implemented without requiring multicast enabled routers to be universally adopted within the network.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

We claim:

1. A method of redirecting a receiving multicast client from a failed information source comprising:
   assigning by a computing device:
      a first multicast client as a primary information source,
      a second multicast client as a secondary source of the information, and
      a receiving multicast client to receive the information from the primary information source;
   receiving, via the computing device, a first message from the receiving multicast client,
      wherein the first message indicates that the receiving multicast client is not receiving the information from the primary information source;
   sending, via the computing device, a second message to the receiving multicast client to determine whether the receiving multicast client is the cause of the information not being received from the primary information source;
   determining whether the receiving multicast client is the cause of the information not being received from the primary information source; and
   in response to determining that the receiving multicast client is not the cause of the information not being received, sending via the computing device:
      a third message to the second multicast client to:
         indicate to the second multicast client that the second multicast client is a new primary information source for the receiving multicast client, and
         indicate to the second multicast client to send the information to the receiving multicast client, and
      a fourth message to the receiving multicast client to indicate to the receiving multicast client that the second multicast client is the receiving multicast client's new primary information source.

2. The method of claim 1, further comprising
flagging a set of secondary receiving multicast clients that are to receive the information from the receiving multicast client so that the receiving multicast client will not be failed in the event that a secondary receiving multicast client sends a message indicating that information is not being received.

3. The method of claim 1, further including:
sending a test message to the receiving client; and
in the event that a valid response to the test message is not received, failing the receiving client and sending a message to a set of secondary receiving clients that are to receive the information from the receiving client that directs the secondary receiving clients to receive information from a new source.

4. The method of claim 1 wherein the new source is a dedicated backup server that reliably sends information to redirected clients.

5. A method of redirecting a receiving multicast client from an underperforming transmitting client, comprising:

receiving a message from the receiving multicast client indicating a rate that information is being received;
determining that the information rate falls below a performance standard;
determining that the receiving multicast client is not a cause of the information rate falling below the performance standard, based on a message received from the receiving multicast client that indicates that the receiving multicast client is not the cause of the information rate falling below the performance standard;
in response to determining that the receiving multicast client is not a cause of the information rate falling below a performance standard, sending;
   a message to the receiving multicast client indicating a new source of the information; and
   a message to the new source of the information directing the new source of the information to send the information to the receiving multicast client.

6. A method of multicasting information to a set of clients comprising:
determining a network location for each of the clients;
determining a performance parameter for each of the clients;
constructing a data topology associated with the set of clients based on the performance parameter associated with each of the clients;
selecting, via a computing device, a subset of the clients to be primary clients and at least one client to be a receiving client, based on the performance parameter and the determined network location, the network location relating to the data topology;
sending, via the computing device, a message to the receiving client to determine whether the receiving client is a cause of information not being received from one of the primary clients;
determining whether the receiving client is the cause of the information not being received from the primary client;
in response to determining that the receiving client is not the cause of the information not being received, transmitting, via the computing device, a message to a primary client of the subset of primary clients directing that primary client to retransmit the information -to the receiving clients.

7. A method of forwarding information from a transmitting client to a receiving client in a multicast group comprising:
receiving, via the transmitting client, an instruction from a multicast server to forward information to the receiving client, based on:
   one or more messages from the receiving client to the multicast server indicating that the receiving client has not received the information and
   a determination that the receiving client is not the cause of the information not being received,
   wherein the information includes a performance report for determining a performance parameter and a network location for the transmitting client and the receiving client, the network location relating to a data topology constructed by the multicast server based on the performance parameter associated with each client in the multicast group;
receiving the information; and
forwarding, via the transmitting device, the information to the receiving client, based on the instruction and the one or more messages that the receiving multicast client is not the cause of the information not being received.

8. The method of claim 7, further comprising displaying the information to a user.

9. The method of claim 7, further comprising displaying the information to a user without positively indicating to the user that the information is being forwarded.

10. A system for multicasting information to a set of clients comprising:
   a server configured to transmit the information to:
      construct a data topology associated with the set of clients based on performance information associated with the set of clients, and
      determine a primary client using performance information and a network location of the set of clients, the network location relating to the data topology; and
   a primary client configured to receive the transmitted information and to forward the information to a secondary client, based on:
      a message from the secondary client to the server indicating that the secondary client did not receive the information, and
      a message from the secondary client to the server indicating that the secondary client is not the cause of the information not being received
      a message from the server directing the primary client to forward the information to the secondary client,
      where the message from the server directing the primary client to forward the information to the secondary client is in response to a determination by the server that the secondary client is not the cause of the information not being received.

11. The method of claim 1 wherein the receiving client is capable of presenting the information to a user at the receiving client.

12. The method of claim 1 wherein the receiving client is a personal computer.

13. A method of redirecting a receiving multicast client from a failed transmitting client comprising:
   receiving, via a multicast server, a message from the receiving multicast client that information is not being received;
   sending, via the multicast server, a message to the receiving multicast client to determine whether the receiving multicast client is the cause of the information not being received;
   determining, via the multicast server, whether the receiving multicast client is the cause of the information not being;
   in response to determining that the receiving multicast client is not the cause of the information not being received, sending, via the multicast server:
      a message to the receiving multicast client indicating a new source of the information; and
      a message to the new source of the information directing the new source of the information to send the information to the receiving multicast client.

* * * * *

UNITED STATES PATENT AND TRADEMARK OFFICE
CERTIFICATE OF CORRECTION

| | | |
|---|---|---|
| PATENT NO. | : 8,830,955 B2 | Page 1 of 3 |
| APPLICATION NO. | : 12/727451 | |
| DATED | : September 9, 2014 | |
| INVENTOR(S) | : Michael Lee et al. | |

It is certified that error appears in the above-identified patent and that said Letters Patent is hereby corrected as shown below:

The title page showing the illustrative figure should be deleted to be replaced with the attached title page.

In the Drawings,

The drawing sheet, consisting of Fig. 7, should be deleted to be replaced with the drawing sheet, consisting of Fig. 7, as shown on the attached page.

In the Specification,

In column 3, line 16, delete "under performing" and insert -- underperforming --, therefor.

In the Claims,

In column 12, line 42, in claim 6, delete "-to" and insert -- to --, therefor.

In column 12, line 43, in claim 6, delete "clients." and insert -- client --, therefor.

In column 14, line 18, in claim 13, delete "being;" and insert -- being received; --, therefor.

Signed and Sealed this
Tenth Day of February, 2015

Michelle K. Lee
*Deputy Director of the United States Patent and Trademark Office*

(12) United States Patent
Lee et al.

(10) Patent No.: US 8,830,955 B2
(45) Date of Patent: Sep. 9, 2014

(54) MULTICAST SYSTEM USING CLIENT FORWARDING

(75) Inventors: Michael Lee, Cupertino, CA (US); Matt Regan, Glen Waverley (AU); Geoff M. Smith, Palo Alto, CA (US)

(73) Assignee: Interval Licensing LLC, Seattle, WA (US)

( * ) Notice: Subject to any disclaimer, the term of this patent is extended or adjusted under 35 U.S.C. 154(b) by 167 days.

(21) Appl. No.: 12/727,451

(22) Filed: Mar. 19, 2010

(65) Prior Publication Data
US 2010/0172354 A1    Jul. 8, 2010

Related U.S. Application Data

(62) Division of application No. 11/683,025, filed on Mar. 7, 2007, now Pat. No. 7,719,985, which is a division of application No. 09/656,538, filed on Sep. 6, 2000, now Pat. No. 7,194,549.

(51) Int. Cl.
*H04W 4/00*    (2009.01)
*H04L 12/18*    (2006.01)

(52) U.S. Cl.
CPC ......... *H04L 12/185* (2013.01); *H04L 12/1854* (2013.01)
USPC ........... 370/331; 709/224; 709/226; 709/229; 709/239

(58) Field of Classification Search
USPC ......... 370/254, 331, 338, 349, 351, 394, 389, 370/408, 411, 466, 401; 709/203, 224, 229, 709/226, 238, 239
See application file for complete search history.

(56) References Cited

U.S. PATENT DOCUMENTS

| | | | |
|---|---|---|---|
| 5,331,637 A | 7/1994 | Francis et al. | |
| 5,355,371 A | 10/1994 | Auerbach et al. | |
| 5,673,252 A | 9/1997 | Johnson et al. | |
| 5,831,975 A | 11/1998 | Chen et al. | |
| 5,887,252 A * | 3/1999 | Noneman | 455/463 |
| 5,905,871 A | 5/1999 | Buskens et al. | |
| 5,910,179 A | 6/1999 | Mohseni | |
| 5,914,798 A | 6/1999 | Liu | |
| 5,926,501 A * | 7/1999 | Souissi et al. | 375/131 |
| 5,938,732 A * | 8/1999 | Lim et al. | 709/229 |
| 5,940,391 A * | 8/1999 | Malkin et al. | 370/390 |
| 6,108,779 A | 8/2000 | Dean et al. | |
| 6,131,123 A | 10/2000 | Hurst et al. | |
| 6,138,144 A | 10/2000 | DeSimone et al. | |
| 6,147,967 A * | 11/2000 | Ying et al. | 370/222 |
| 6,167,025 A * | 12/2000 | Hsing et al. | 370/216 |
| 6,216,167 B1 | 4/2001 | Momirov | |
| 6,226,684 B1 * | 5/2001 | Sung et al. | 709/238 |
| 6,247,050 B1 * | 6/2001 | Tso et al | 709/224 |
| 6,247,059 B1 | 6/2001 | Johnson et al. | |

(Continued)

OTHER PUBLICATIONS

Core Selection Method for Multicast Routing Kenneth L Calvert Ellen W. Zegura Michael J. Donahoo.*

(Continued)

*Primary Examiner* — Hassan Phillips
*Assistant Examiner* — Ajay Cattungal
(74) *Attorney, Agent, or Firm* — Perkins Coie LLP

(57) ABSTRACT

A system and method are disclosed for multicasting information to a set of clients that includes transmitting the information to a primary client from a server and instructing the primary client to forward the information to a secondary client.

13 Claims, 10 Drawing Sheets

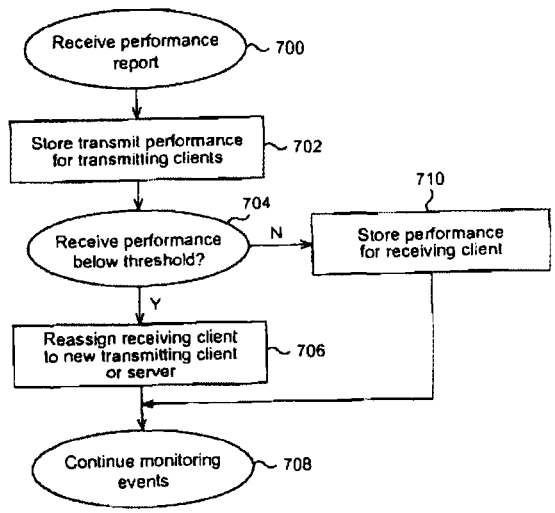

UNITED STATES PATENT AND TRADEMARK OFFICE
CERTIFICATE OF CORRECTION

| | | |
|---|---|---|
| PATENT NO. | : 8,830,955 B2 | Page 1 of 1 |
| APPLICATION NO. | : 12/727451 | |
| DATED | : September 9, 2014 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this
Third Day of November, 2015

Michelle K. Lee
*Director of the United States Patent and Trademark Office*